United States Patent
Carlsson et al.

(10) Patent No.: US 7,539,515 B2
(45) Date of Patent: May 26, 2009

(54) METHOD AND ARRANGEMENT RELATING TO COMMUNICATIONS NETWORK

(75) Inventors: Roland Carlsson, Öjersjö (SE); Pär Ankel, Nödinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 459 days.

(21) Appl. No.: 10/584,756

(22) PCT Filed: Jan. 29, 2004

(86) PCT No.: PCT/SE2004/000125

§ 371 (c)(1),
(2), (4) Date: Jun. 27, 2006

(87) PCT Pub. No.: WO2005/064815

PCT Pub. Date: Jul. 14, 2005

(65) Prior Publication Data

US 2007/0147328 A1    Jun. 28, 2007

(30) Foreign Application Priority Data

Dec. 29, 2003   (WO) .................. PCT/SE03/02093

(51) Int. Cl.
*H04M 1/00*  (2006.01)

(52) U.S. Cl. ...................... 455/561; 455/522
(58) Field of Classification Search .............. 455/69, 455/522, 554.2, 561, 550, 550.1; 379/58
See application file for complete search history.

(56) References Cited

U.S. PATENT DOCUMENTS

| 6,351,650 | B1 | 2/2002 | Lundby et al. |
| 6,594,499 | B1 | 7/2003 | Andersson et al. |
| 2002/0002058 | A1 | 1/2002 | Hamabe |

FOREIGN PATENT DOCUMENTS

WO    02/23936    3/2002

OTHER PUBLICATIONS

International Search Report for PCT/SE04/00125 dated Oct. 6, 2004.

*Primary Examiner*—Tu X Nguyen
(74) *Attorney, Agent, or Firm*—Nixon & Vanderhye, P.C.

(57) ABSTRACT

The present invention relates to a method and arrangement for downlink power adjustment in a base station (210, 310, 610) comprising at least two similar hardware units: a first unit (231, 316a, 616a) and a second unit (232, 316b, 616b), in a communications network when moving a resource from said first unit to said second unit. The method comprises configuring said resource, providing a sample of a power level, transferring said power sample from said first unit to said second unit, and controlling the power level on the second unit towards a power value provided as a power level with turned off output power on said second unit.

33 Claims, 5 Drawing Sheets

PRIOR ART

Fig.1

PRIOR ART

METHOD AND ARRANGEMENT RELATING TO COMMUNICATIONS NETWORK

This application is the US national phase of international application PCT/SE2004/000125 filed 29 Jan. 2004, which designated the U.S. and claims priority to PCT/SE2003/002093 filed 29 Dec. 2003, the entire content of each of which is hereby incorporated by reference.

THE FIELD OF THE INVENTION

The present invention relates to a method and arrangement relating to telecommunications and especially to power adjustment in a communications network, in particular in a cellular network, e.g. based on Wideband Code Divisional Multiple Access (WCDMA), CDMA, or any other communications network with need for power adjustment and adjustment.

THE BACKGROUND OF THE INVENTION

Wideband Code-Division Multiple-Access (WCDMA) is one of the main technologies for the implementation of third-generation (3G) cellular systems. It is based on the radio access technique proposed by ETSI Alpha group and the specifications was finalised 1999.

The implementation of WCDMA is a technical challenge because of its complexity and versatility. The complexity of WCDMA systems can be viewed from different angles: the complexity of each single algorithm, the complexity of the overall system and the computational complexity of a receiver. W-CDMA link-level simulations are over 10 times more compute-intensive than current second-generation simulations. In W-CDMA interface different users can simultaneously transmit at different data rates and data rates can even vary in time. UMTS networks need to support all current second-generation services and numerous new applications and services.

The WCDMA air interface has been standardized by $3^{rd}$ Generation Partnership Project (3GPP) as a radio transport medium for global mobile communication systems. The specification allows superior user data rates and systems throughput capacities compared to any $2^{nd}$ generation mobile communication standard. The adaptability of WCDMA system enables new ad significant evolutionary step in packet data access.

Figure 1:
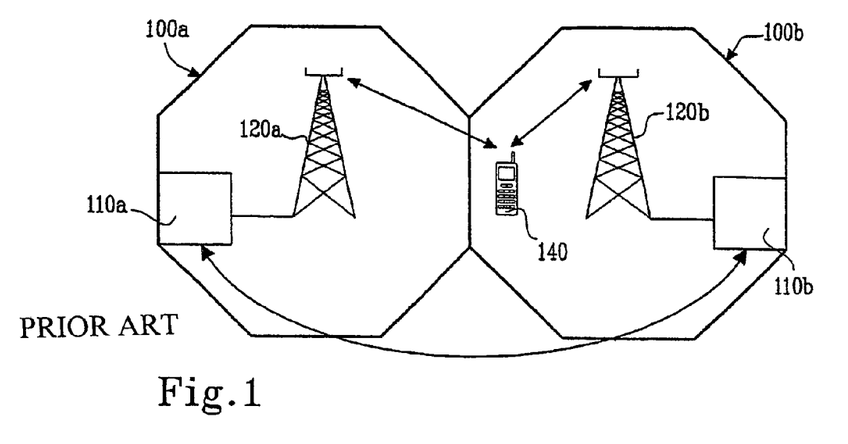
FIG. 1 is a schematic illustration of a cellular communication network according to prior art.

$3^{rd}$ Generation Partnership Project (3GPP), see for example 3GPP TS 25.433 V5.6.0 (2003-09): "Technical Specification Group Radio Access Network; UTRAN Iub interface NBAP signalling (Release 5)", describes a procedure for handling Down Link (DL) power control, when handing over communication from one base station to another one, as illustrated in FIG. 1. FIG. 1 illustrates two cells 100a and 100b in a cellular communication network, such as a WCDMA. For each cell there is a radio access point 110a/110b. Access points in the UMTS-system are referred to as Node B. A Node B houses one or several radio transceivers and handles the radio-link protocols with the User Equipment (UE). Each Node B provides radio coverage in a specific area and therefore effectively defines one or several cells of the UMTS cellular system. In a large urban area, there will potentially be a large number of Node B(s) deployed. In the following, the access points are referred to as base stations 110a/110b, connected to a base station antenna 120a and 120b, respectively, transmitting and receiving signals to/from a transmitter device (User Equipment (UE)) 140. When handling over communication from one base station, e.g. 110a to 110b, the power between the base stations must be controlled and balanced. This means that the output power from the base station 110b is set to substantially the level of base station 110a. This functionality is obtained through the network control (UTRAN).

The downlink transmit power control procedure, controls simultaneously the power of a DPCCH and its corresponding DPDCHs. The power control loop adjusts the power of the DPCCH and DPDCHs with the same amount, i.e. the relative power difference between the DPCCH and DPDCHs is not changed. The relative transmit power offset between DPCCH fields and DPDCHs, is determined by the network. The TFCI, TPC and pilot fields of the DPCCH are offset relative to the DPDCHs power by PO1, PO2 and PO3 dB respectively. The power offsets may vary in time.

The patent documentation is silence about a solution according to the present invention. However, power balancing between base stations is considered, e.g.: U.S. Pat. No. 6,351,650 discloses forward power control during a soft handoff in a wireless communication system, accomplished by tracking each power command (PC) transmitted from a mobile unit to two or more base station transceiver systems (BTSs). Each BTS may interpret power commands differently due to noise. However, the power commands are relayed to a selector along with additional data transmitted in a conventional fashion. The selector determines the power levels of each BTS and transmits power charge commands to maintain power balance between the BTSs. The BTSs may transmit each PC command to the selector or accumulate several PC commands and send a PC history to the selector. The selector generates a reference PC history, which may be one of the PC histories transmitted from a BTS, a combination thereof, and the result of data processing on the one or more PC histories. Individual power change commands or the reference PC history is transmitted back to the BTS to adjust the transmitter output level of each BTS so that the BTSs are transmitting at compatible signal levels A transmit power load balancing technique in accordance with WO 02/23936 is used to increase the overall communication capacity of a radio communications system without incurring substantial, additional control signalling. An overloaded connection in a first cell serviced by a radio network is detected, and a second nearby cell, which is not overloaded, is identified. For a radio use node that has a connection with the radio network, radio transmission from the first overloaded cell is prevented or at least avoided in the downlink direction from the radio network to the radio use node. Instead, a radio transmission associated with that connection is established or otherwise permitted from the second cell in the downlink direction to the radio use node. The prevented or avoided downlink radio transmission is a traffic transmission. On the other hand, downlink control signalling associated with the connection from the first cell to the radio use node is permitted.

THE SUMMARY OF THE INVENTION

Figure 2:
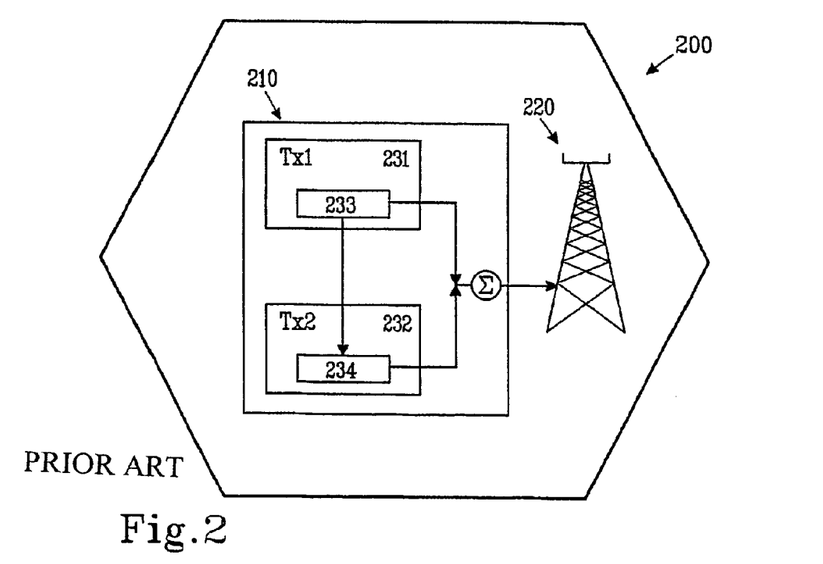
FIG. 2 is a schematic illustration of a base station according to prior art.

FIG. 2 illustrates a typical cell 200, for example in a WCDMA based communications network, comprising a base station 210, a base station antenna 220 and base station transceiver hardware 230. The base station hardware 230 may comprise several (physically separated) units 231 and 232, respectively, in this case, Tx1 and Tx2, respectively. Each transmitter comprises one or several hardware resources 233 and 234, respectively, such as a channel resource.

From time to time, it can be necessary to move a channel resource between two units, e.g. from Tx1 to Tx2. The relocation of the channel resources may depend on several reasons, for example:

Maintenance: before removing one unit, channel resources in use are moved to another unit, Malfunction: if a hardware unit indicates a hardware failure, a channel resource is moved to another unit, Resource management:

if a hardware unit has no further available resources or its maximum load, e.g. higher data rate, is reached, a channel resource can be allocated on another unit.

Using additional radio link and additional transmitter units transmitting with same power.

Presently, when moving a resource from one hardware unit to another one, in the same base station, it is difficult to achieve the same power level in the new unit (Tx2) as in the old one (Tx1), especially when the power level is frequently updated. In WCDMA, the power level is updated every time slot (0.667 ms). Handling this requires faster communication between the units (transmitters 1 and 2) than the power update frequency. This implies that a faster interface and thus more expensive one must be provided between the hardware units. Otherwise, the power level of the new unit, i.e. Tx2 will be incorrect. Eventually, the Tx1 is turned off and Tx2 is turned on. The switching between the transmitters and their on and off states is performed synchronized. In mobile CDMA systems, for example, the power is changed rapidly, e.g. in fading environments.

Problems with existing solutions are, amongst others, the requirement for a fast interface between hardware units and if the hardware units are already manufactured and delivered, the difficulty of adding new interfaces.

Thus, the main object of the present invention is to provide a method and arrangement to solve the above-recognised problems, i.e. controlling power level when at least resources in same base station, specially channel resources are relocated between two hardware resources.

Surprisingly, it has been noted that the existing functionality (within 3GPP), normally intended for balancing power between two separate radio base stations, can be used to control the power level when handing over resources between two hardware units in one base station, i.e. balancing the power between at least two hardware units. The result is that the downlink power will not change (or be substantially the same) when switching over to a new hardware unit in the base station.

Other advantages of the invention include:

Cost-effective solution in cases the hardware cannot be replaced or upgraded; the need for new wiring in already installed equipment and additional interfaces in new equipment is eliminated The functionality already exists in the Radio Base Station's hardware and the control is already defined in 3GPP standard (see for example 25.433 UTRAN Iub interface NBAP signalling). Thus, no need for additional resources.

For above reasons, a method in a communications network when moving a resource from said first unit to said second unit is provided for downlink power adjustment in a base station. The base station may comprise at least two similar hardware units: a first unit and a second unit. The method comprises: configuring said resource, providing a sample of a power level, transferring said power sample from said first unit to said second unit, and controlling the power level on the second unit towards a power value provided as a power level with turned off output power on said second unit.

Most preferably the resource is a channel resource, but other resources are applicable. Thus, the hardware units may be transmitter units.

Most preferably, said downlink power adjustment compensates for power drift between different units during handover. The compensation is achieved by periodically adjusting the power by a step that is proportional in size to an offset between a used power and a reference power. Each adjustment is executed as a number of smaller adjustments applied over an adjustment period. The downlink power adjustment may perform the adjustments on a Radio Link (RL) basis. The adjustments are performed synchronously, in a preferred embodiment. The power adjustment is superimposed on an inner loop power control adjustment if activated.

According to one preferred embodiment, the power adjustment modification is:

$$\sum P_{bal} = (1-r)(P_{ref} + P_{P\text{-}CPICH} - P_{init})$$

wherein the sum is performed over an adjustment period corresponding to a number of frames equal to a value of an Adjustment Period, $P_{ref}$ is the value of DL Reference Power, $P_{P\text{-}CPICH}$ is the power used on a primary Common Pilot Channel, $P_{init}$ is a code power of a last slot of a previous adjustment period and r is given by an Adjustment Ratio.

Most preferably, a power step size of x dB, y power adjustments are performed preferably evenly distributed over an Adjustment Period, where:

$y=(\Sigma P_{bal})/x$.

In one embodiment, the sample of power level is obtained from the first unit or preset.

According to one embodiment, if the network configures power adjustment in a system having several RLs connected to one mobile unit, then configured values of system specific parameters ("Adjustment Period", "Adjustment Ratio", "Max Adjustment Step"; "DL Reference Power") are used to achieve convergence between channel resources when moving of a channel resource is performed. A convergence time depends on setting of said parameters, which can be modified by said base station to speed up a convergence time. The parameters are reset to original values.

However, if the network has not configured power adjustment, said base station itself turns on adjustment, during movement of a resource. The power adjustment is turned off after movement of the resource.

In one embodiment, if said base station needs to move a channel resource, it sends an indication to the network (RNC), requesting the RNC to turn on power adjustment on all radio links connected to a mobile unit.

The invention also relates to a data structure used in a computer-generated instruction set for power adjustment. The data structure comprises a pilot field, first and second Dedicated Physical Data Channels (DPDCH) field, Transport Format Combination, and Indicator Transmit Power Control, second DPDCH field being arranged previous in to said pilot field, and wherein a downlink increase/decrease is applied before said pilot field. A sample is taken at said pilot field before an adjustment period subtracted with a pilot power offset during an adjustment period.

The invention also relates to base station in a communications network. The base station comprises at least two hardware units: a first and a second hardware unit, and a controller unit. The base station is arranged to allow handover of recourses between said hardware units. A controller unit is arrange to adjust power between said hardware units, said controller unit comprising a processor unit for configuring said resource, obtaining a sample of a power, transferring said power sample from said first hardware unit or predetermined source to said second hardware unit and means for controlling the power level on said second unit by a power control value calculated with turned off output power on said second unit. Most preferably, the network is WCDMA based network. The base station may be connected to Radio Network Controller. Preferably, the hardware units are transmitter units. The resource may be a channel resource. Preferably, the base station transmits into two cells in said network. The handover can be under addition of a new cell. The base station may further comprise a controller for connecting and disconnecting outputs from said transmitter units to a base station output.

The invention also relates to an arrangement in a communications network. The network has a base station comprising at least two hardware units: a first and a second hardware unit, and a controller unit. The base station is arranged to allow handover of recourses between said hardware units. The arrangement, arranged to adjust power between said hardware units comprises a processor unit for configuring said resource, means for obtaining a sample of a power, means for transferring said power sample to said second hardware unit and means for controlling the power level on second unit by a power control value calculated with turned off output power on said second unit. The hardware units may be transmitter units and the resource a channel resource. The arrangement may further comprise means for connecting and disconnecting outputs from said transmitter units to a base station output.

SHORT DESCRIPTION OF THE DRAWINGS

In the following, the invention is described with reference to a number of drawings illustrating some aspects of the invention in a non-limiting way, in which.

ABBREVIATIONS

For the purposes of the present document, the following abbreviations apply:
CFN Connection Frame Number
CPICH Common Pilot Channel
DL Downlink
DPCCH Dedicated Physical Control Channel
DPDCH Dedicated Physical Data Channel
RL Radio Link
RNC Radio Network Controller
TFC Transport Format Combination
TFCI Transport Format Combination Indicator
TPC Transmit Power Control
UMTS Universal Mobile Telecommunications System
UTRAN Universal Terrestrial Radio Access Network

DETAILED DESCRIPTION OF THE PREFERRED EMBODIMENTS

In the following the invention is described with reference to a third-generation (3G) cellular telecommunication system, implementing WCDMA. However, the invention is not limited to the described and illustrated embodiments and can be implemented in any communication network allowing power adjustment.

Shortly, a power adjustment or balancing between an old unit and a new one is obtained by achieving convergency by providing a power value towards which the power of the new unit is controlled to. The power value can be obtained from the old unit, be predetermined or sat depending on the functionality.

Power balancing and adjustment will be described in more detail in conjunction with following three cases:
1. When the network (RNC) configures the power adjustment in a WCDMA system (usually because several RLs are connected to one UE).
2. When the network has not configured power adjustment.
3. When the Base Station needs to move a channel resource.

Figure 3:
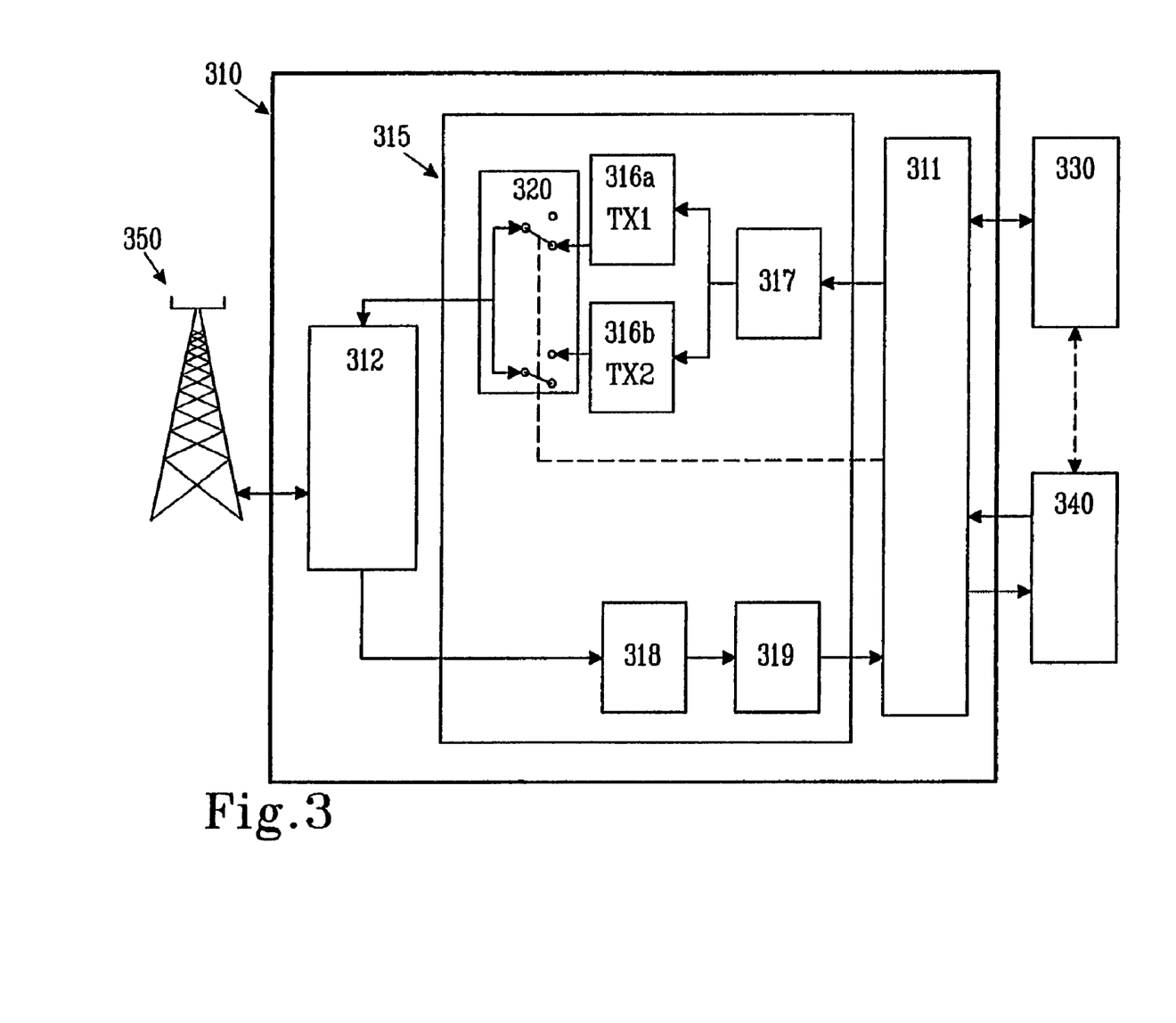
FIG. 3 illustrates a preferred embodiment of a base station in more detail.

Block diagram of FIG. 3, illustrates a preferred embodiment of a base station 310 (Node B) in more detail, employing the power adjustment arrangement, according to the present invention. The base station (disclosed very schematically) comprises an Interface Board 311, a RF coupler (and power splitter) 312 and a transmitter/receiver unit 315. The transmitter/receiver unit 315 includes transmitter units 316a and 316b connected to a coder 317 and the RF coupler 312, and the receiver unit 318 is connected to a decoder 319 and the RF coupler 312.

The base station is connected to a Controller Unit 330, Network Controller (RNC) 340 and a base station antenna 350. It is appreciated that the function and functional units of an ordinary base station, and specially a WCDMA base station are known by a skilled person and thus not disclosed in detail herein, unless a specific entity contributes to the understanding of the invention.

The transmitter unit 316a (Tx1) is a Source transmitter. Transmitter unit 316b comprises one or several Destination units (cards). A control device 320, in this example realized as a switch is arranged to control the output of the transmitter units. The controller unit 330 controls the control device 320 through the interface board. It is also possible to integrate the interface unit and the controller unit.

The connection between a base station and a mobile unit may include communication via one or several radio links, which implies that same information is transmitted in several cells and the mobile unit can uses the information from these cells. According to one embodiment of the invention, one transmitter unit can generate all RLs to one mobile unit. However, it is possible to use one transmitter for each RL. This means that one transmitter unit can comprise several destination cards.

When a channel resource (or RL) is moved from Tx1 to Tx2, the channel resource is configured and a sample of the power level on the source unit is taken and transferred from Tx1 to Tx2. However, the sample can also be set without a need for an old sample, e.g. as a preset value. This allows making the power adjustment if the synchronization is lost. The power level on the new channel resource is from this moment power controlled, i.e. the power control value is calculated with turned off output power. Thus, the destination unit Tx2 is turned off, i.e. no output power during the power adjustment or convergence period. This is one of the min differences between power adjustment suggested by 3GPP and the present invention. Thus, the destination card does not affect the total signal transmitted to a mobile unit (cell phone) before it is ready to take over the transmission.

Thus, the invention also allows adjustment of power between several RLs within a base station.

When both hardware units are power adjusted, the DL power adjustment is started on both units, controlled in same way.

DL power adjustment compensates for power drift between different units during the handover. This is achieved by periodically adjusting the power by a step that is proportional in size to the offset between the used power and a reference power. Each adjustment is executed as a number of smaller adjustments applied over an adjustment period. The DL power adjustment function performs the adjustments on a Radio Link (RL) basis. The RL is identified with the parameters "Resource1 ID" and "Resource2 ID". The function always performs the adjustments in a synchronous way.

After the reception of the parameters on the resource, the power adjustments are started at the first slot of a frame fulfilling "CFN" mod "Adjustment Period"=0 and repeated for every adjustment period and restarted at the first slot of a frame with CFN=0.

Figure 4:
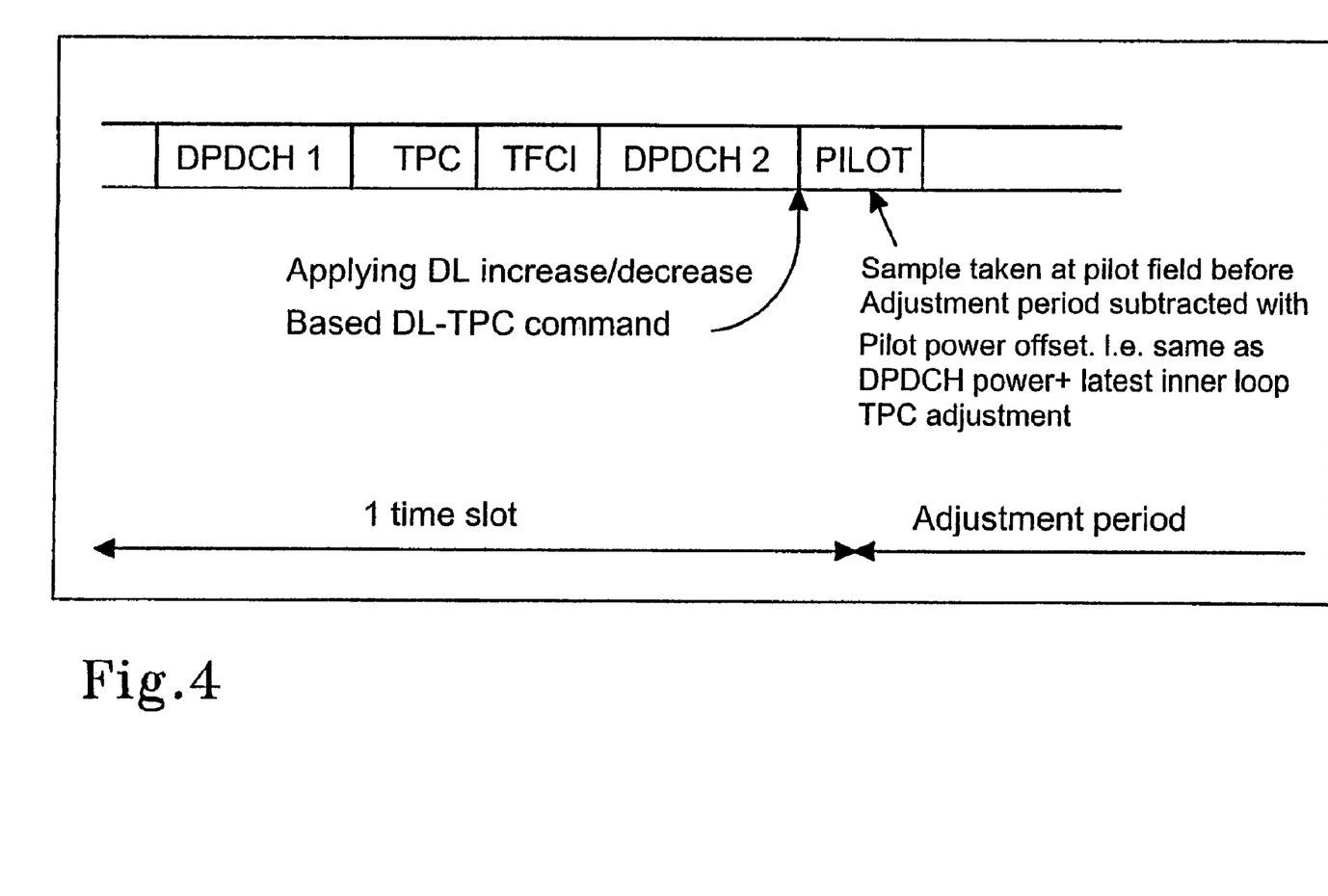
FIG. 4 illustrates a DL power sample in an exemplary DL power adjustment algorithm.

According to FIG. 4, the sample of the "DL power" in the formula is performed on the pilot field immediately before the Adjustment Period subtracted with "Power offset of Pilot".

According to 3GPP, four parameters are used for controlling DL power adjustment: Adjustment Period, Adjustment Ratio, Max Adjustment Step and Reference power.

Thus, according to case 1, when the network (RNC) configures the power adjustment in a WCDMA system (usually because several RLs are connected to one UE), then the configured values of parameters such as "Adjustment Period", "Adjustment Ratio", "Max Adjustment Step" and "DL Reference Power" can be used to achieve some convergence between channel resources when relocation of a channel resource is performed. However, the convergence time depends on the setting of these parameters. To speed up the convergence time the base station can modify the parameter setting of some or all of them.

The power adjustment tuning is superimposed on the inner loop power control adjustment if activated. The power adjustment tuning uses (other approaches may occur):

$$\sum P_{bal} = (1-r)(P_{ref} + P_{P-CPICH} - P_{init})$$

Wherein the sum is performed over an adjustment period corresponding to a number of frames equal to the value of the Adjustment Period, $P_{ref}$ is the value of the DL Reference Power, $P_{P-CPICH}$ is the power used on the primary CPICH, $P_{init}$ is the code power of the last slot of the previous adjustment period and r is given by the Adjustment Ratio.

If the last slot of the previous adjustment period is within a transmission gap due to compressed mode, $P_{init}$ is set to the same value as the code power of the slot just before the transmission gap.

The adjustment within one adjustment period is in any case performed with the constraints given by the Max Adjustment Step and the DL TX power range set by the CRNC.

In order to guarantee a convergence, reducing the error by a factor, e.g. 2 every Adjustment Period, the Adjustment Ratio is set to e.g. 0.5.

If the change of hardware unit is triggered by RNC reconfiguration, e.g. for increasing data rate etc., there is very short time to execute the power adjustment procedure.

After a while, the source unit (Tx1) turns off the power while the target unit (Tx2) turns on the power exactly simultaneously.

The power adjustments is started at the first slot of a frame with CFN modulo the value of Adjustment Period equal to 0 and is repeated for every adjustment period and restarted at the first slot of a frame with CFN=0, until a new DL POWER CONTROL REQUEST message is received or the RL is deleted.

As mentioned earlier, DL power adjustment is used to make the DL power on two different hardware units converge. Independent of the current configuration, the following DL power adjustment parameters may be sent to new and old units (the parameter values are given as non-limiting examples):

DL Power Mode of the resource, same as Current Power (CP) mode, but with DL Power adjustment.

Adjustment period=2 frames

Adjustment ratio=0.5

Max Adjustment step=1 slot (i.e. 1 dB/1 slot)

The above parameters have proven to provide best convergence for some specific embodiments.

DL Transmission power on the new resource can be set to the received value from old RESOURCE for each RL.

DL transmission power is not changed on the old resource (if RL is assigned to a MS). If DL power adjustment is activated the existing "DL Reference Power" is used. Optionally, if the network does not currently activate DL power adjustment, DL Power Reference it is set to the same value as it was received in parameter "DL Transmission Power" received from the old unit.

Figure 5:
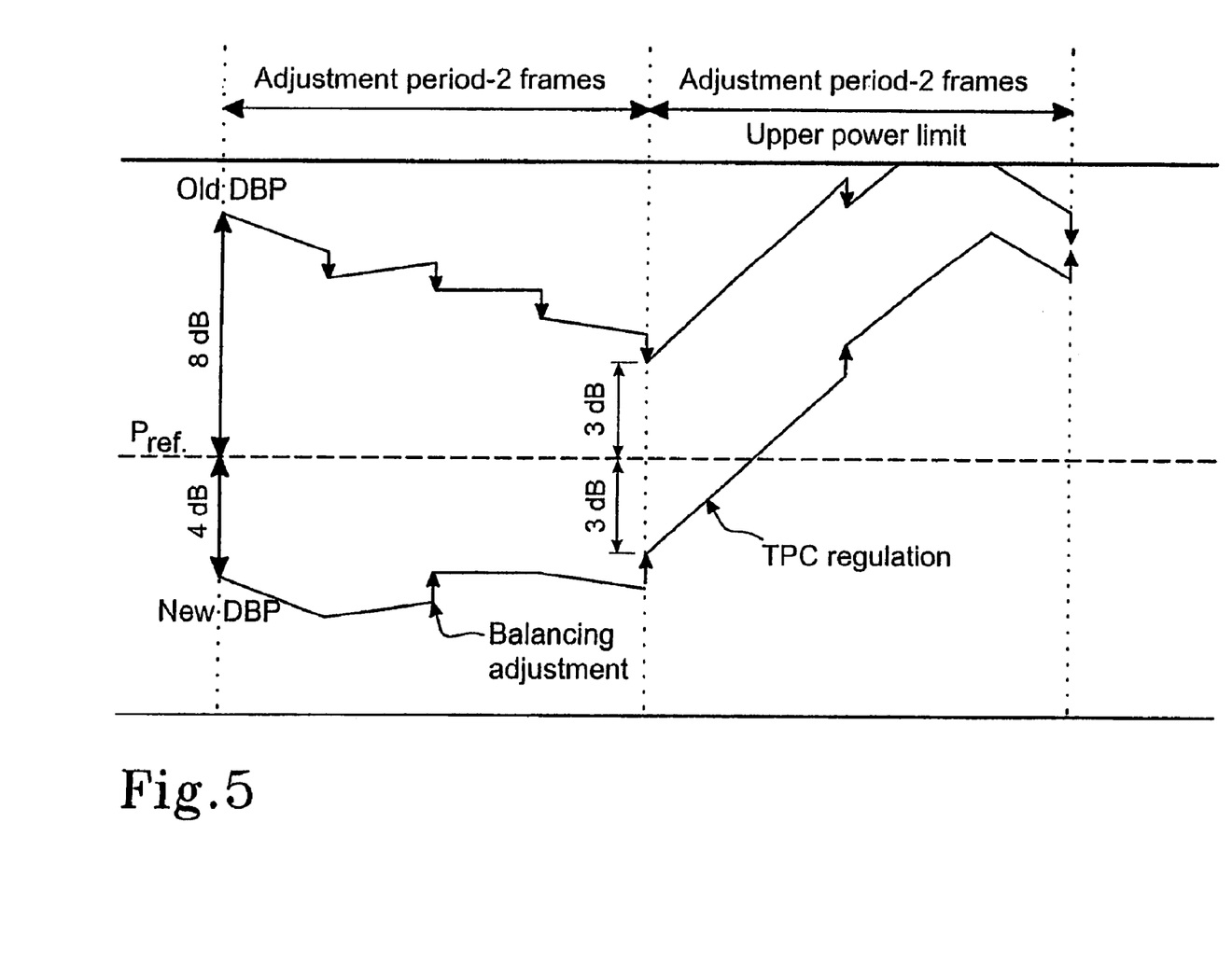
FIG. 5 illustrates a DL power convergence of two resources.

This setting is performed for each RL on both units:

With DL power adjustment activated, the power on the two RLs will converge as both are regulated towards the same power level; this is illustrated in FIG. 5. FIG. 5 is an example of DL power convergence of two resources with DL power adjustment during two adjustment periods. The arrows show the DL Power adjustment tuning.

In case constant DL power is used, the same power can be used on the new resource as on the old resource and as Reference power has the same value as the transmission power, there will be no adjustments, i.e. both resources will have same power. This is the case if the inner loop is disabled or the adjustment is out of synchronization.

As both units use the same parameter settings, it can be shown that after "n" number of Adjustment Periods performed on both units, the maximum error is:

(max [Adjustment Ratio, (1-Adjustment Ratio)])
$^{n}*P_{error}$ at Adjustment period start.

DL power adjustment algorithm does not need to be started at the same time on both units. At the Adjustment Period start of the first period where both units perform adjustment, the difference in power on the two units can in worst case be as large as the dynamic range (extreme case, e.g. >20 dB). In most cases the power difference will be much smaller. The dynamic range is controlled due to the upper or lower power limits.

Assuming that there will be 5 Adjustment Periods where both units perform adjustment and the dynamic range is 25 dB, the maximum error will be approximately $0.5^5*25=\pm0.75$ dB.

Following definitions (valid for all three cases) are used for calculation of error after an Adjustment Period:

$P_{old,n}$: Power of old TX unit at point n.
$P_{new,n}$: Power of new TX unit at measurement point n.
n: The point when a power adjustment period is ended (n>0).
$P_{ref}$: Power reference used by power adjustment.
K: 1-Adjustment Ratio
$P_{diff,n}$: Power difference at time n.
$P_{acc,n}$: Power change corresponds to accumulated TPC commands between n and n+1.
$P_{disc\_old,n}$: Power change corresponds to accumulated TPC commands that are discarded due to power limitations between n and n+1 for the old unit. This due to the upper or lower power limits (see FIG. 4)
$P_{disc\_new,n}$: Power change corresponds to accumulated TPC commands that are discarded due to power limitations between n and n+1 for the new unit.

Calculated error after an Adjustment Period:

$$P_{old,n+1}=P_{old,n}-K*(P_{old,n}-P_{ref})+P_{acc,n}-P_{disc\_old,n}$$

$$P_{new,n+1}=P_{new,n}-K*(P_{new,n}-P_{ref})+P_{acc,n}-P_{disc\_new,n}$$

$$P_{diff,n+1}=P_{old,n+1}-P_{new,n+1}=P_{diff,n}-K*(P_{old,n}-P_{new,n})-P_{disc\_old,n}+P_{disc\_new,n}=(1-K)*P_{diff,n}-P_{disc\_old,n}+P_{disc\_new,n}$$

With $0 \leq P_{disc\_old,n}-P_{disc\_new,n} \leq P_{diff,n}$ ($P_{diff,n} \geq 0$)—
$K*P_{diff,n} \leq P_{diff,n+1} \leq (1-K)*P_{diff,n}$ (same result can be shown if $P_{diff,n}<0$)

The adjustments described is done for each RL, according to following example:

A reference power is allocated to each BS and the DL power used by each radio link is periodically adjusted according to a method described below. The result of this is that the BS's power levels slowly converge to the reference power. In this way the RBS power drift is reduced. This algorithm can be used when a connection is in Soft handover.

It is possible to change the DL power adjustment method by the configuration parameter, in case the parameter value is No Balancing, the DL power adjustment is turned off, but inner loop power control is running. If the parameter value is Adjustment, the DL Power adjustment is turned on and running together with inner loop power control. If the parameter value is Fixed Adjustment, the DL Power adjustment is turned on but a pre-configured value can be used as a DL Reference Power instead of calculated reference value. In this case, the inner loop power control can be disabled. If the parameter value is Fixed, the DL power adjustment is turned off.

The reference power for the BSs must be calculated in the RNC. In order to have an even power split between the BSs the same reference power level must be sent to each RBS. The default case will be the even power split case. RNC may also decide a reference power to each RL, e.g. same reference power to all RLs.

The DL Power adjustment is done in a synchronized way. As mentioned earlier, this is achieved by restarting a new Adjustment Period whenever $$mod(CFN, AdjustmentPeriod)=0$$

e.g. in the case of Adjustment Period=100 a new Adjustment Period is started at CFN={0, 100, 200}. Also the DL Power adjustment is restarted at the first slot of a frame with CFN=0.

The RBS part of DL Power adjustment algorithm is implemented in DL power setting algorithm, in accordance with the following:

As described earlier, the power adjustment tuning to be performed during the "Adjustment Period" is defined as $$\sum P_{bal}.$$

The adjustment can be implemented according to the following:

With a power step size of x dB, y power adjustments are performed preferably evenly distributed over the "Adjustment Period", where:

$$y=(\Sigma P_{bal})/x.$$

The power adjustments that results of the DL power adjustment algorithm, is applied at the timeslot start.

When the power mode is "DL Inner-loop+DL Power Adjustment" power mode, the resulting DL power change for each slot is the sum of the "DL Power adjustment" power change (actually applied at the timeslot start) and the TPC from the "DL Inner-loop Power Control" (actually applied at the pilot field, FIG. 4).

The power limits (upper, lower) are from "DL Inner-Loop Power Control".

Figure 6:
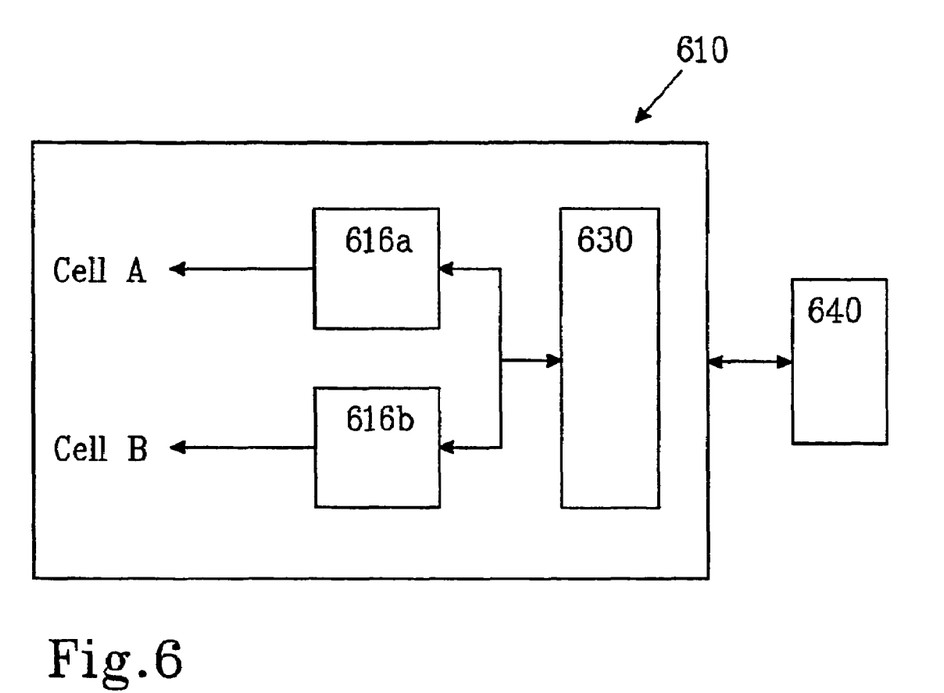
FIG. 6 illustrates a second preferred embodiment of a base station.

Block diagram of FIG. 6, illustrates another preferred embodiment of a base station 610 (Node B), employing the power adjustment arrangement, according to the present invention. The base station (disclosed very schematically) comprises transmitter units 616a and 616b connected to a controller unit 630. The base station is connected to a Network Controller (NC) 640. It is appreciated that the function and functional units of an ordinary base station is well known by a skilled person and not disclosed in detail herein, unless a specific entity contributes to the understanding of the invention.

The transmitter unit 616a is a Source transmitter while transmitter unit 616b comprises Destination card and additional RLs.

The base station according to this embodiment is used when an RL is added to the network, i.e. a new cell, and the base station is urged to transmit with same power into the new cell as the previous cell.

Also in this case a power adjustment is conducted in same manner as the above-mentioned example. However, the control unit directly controls the transmitters and executes the power adjustment and adjustment procedure as mentioned earlier.

Thus, according to case 2, if the network has not configured power adjustment (valid for all communication systems allowing power adjustment), the Base Station itself can turn on adjustment, during movement of a channel resource. After power adjustment, the procedure is turned off.

If the Base Station needs to move a channel resource according to case 3, it can send an indication to the network, e.g. to RNC informing it about the resource relocation, and thus requesting the RNC to turn on power adjustment on all RLs connected to a mobile unit. The gain by this is that all RLs connected to a mobile unit will power adjust the DL power towards the same "DL Reference Power" using the same parameter values. For WCDMA this would require an addition to the Iub interface, described in ref 25.433 (NBAP).

The invention is not limited to the shown embodiments but can be varied in a number of ways without departing from the scope of the appended claims and the arrangement and the method can be implemented in various ways depending on application, functional units, needs and requirements etc.

The invention claimed is:

1. A method for downlink power adjustment in a base station comprising at least two similar hardware units: a first unit and a second unit, in a communications network when moving a resource from said first unit to said second unit, the method comprising:
   configuring said resource,
   providing a sample of a power level,
   transferring said power sample from said first unit to said second unit, and
   controlling the power level on the second unit towards a power value provided as a power level with turned off output power on said second unit.

2. The method of claim 1, wherein said resource is a channel resource.

3. The method of claim 1, wherein said hardware units are transmitter units.

4. The method according to claim 1, wherein said downlink power adjustment compensates for power drift between different units during handover.

5. The method of claim 4, wherein said compensation is achieved by periodically adjusting the power by a step that is proportional in size to an offset between a used power and a reference power.

6. The method of claim 5, wherein each adjustment is executed as a number of smaller adjustments applied over an adjustment period.

7. The method of claim 5, wherein said downlink power adjustment is performs the adjustments on a Radio Link (RL) basis.

8. The method of claim 7, wherein the adjustments are performed synchronously.

9. The method of claim 7, wherein the power adjustment is superimposed on an inner loop power control adjustment if activated.

10. The method of claim 9, wherein the power adjustment tuning is:

$$\sum P_{bal} = (1-r)(P_{ref} + P_{P-CPICH} - P_{init})$$

wherein the sum is performed over an adjustment period corresponding to a number of frames equal to a value of an Adjustment Period, $P_{ref}$ is the value of DL Reference Power, $P_{P-CPICH}$ is the power used on a primary Common Pilot Channel, $P_{init}$ is a code power of a last slot of a previous adjustment period and r is given by an Adjustment Ratio.

11. The method of claim 1, wherein a power step size of x dB, y power adjustments are performed preferably evenly distributed over an Adjustment Period, where:

$$y=(\Sigma P_{bal})/x.$$

12. The method of claim 1, wherein the sample of power level is obtained from the first unit.

13. The method of claim 1, wherein the sample of power level is preset.

14. The method of claim 1, wherein if the network (RNC) configures power adjustment in a system having several RLs connected to one mobile unit, then configured values of system specific parameters ("Adjustment Period", "Adjustment Ratio", "Max Adjustment Step"; "DL Reference Power") are used to achieve convergence between channel resources when moving of a channel resource is performed.

15. The method of claim 14, wherein a convergence time depends on setting of said parameters, which can be modified by said base station to speed up a convergence time.

16. The method of claim 15, wherein said parameters are reset to original values.

17. The method of claim 1, wherein if the network has not configured power adjustment, said base station itself turns on adjustment, during movement of a resource.

18. The method of claim 17, wherein the power adjustment is turned off after movement of the resource.

19. The method of claim 1, wherein if said base station needs to move a channel resource, it sends an indication to the network (RNC), requesting the RNC to turn on power adjustment on all radio links connected to a mobile unit.

20. A data structure used in a computer generated instruction set for power adjustment method of claim 1, said data structure comprising a pilot field, first and second Dedicated Physical Data Channels (DPDCH) field, Transport Format Combination, and Indicator Transmit Power Control, second DPDCH field being arranged previous in to said pilot field, and wherein a downlink increase/decrease is applied before said pilot field.

21. The data structure of claim 20, wherein a sample is taken at said pilot field before an adjustment period subtracted with a pilot power offset during an adjustment period.

22. In a communications network, a base station comprising at least two hardware units, a first and a second hardware unit, and a controller unit, said base station being arranged to allow handover of recourses between said hardware units, characterised in
   that a controller unit is arrange to adjust power between said hardware units, said controller unit comprising a processor unit for configuring said resource, obtaining a sample of a power, transferring said power sample from said first hardware unit or predetermined source to said second hardware unit and means for controlling the power level on said second unit by a power value calculated with turned off output power on said second unit.

23. The base station of claim 22, wherein said network is WCDMA based network.

24. The base station of claim 23, being connected to Radio Network Controller.

25. The base station of claim 22, wherein said hardware units are transmitter units.

26. The base station of claim 23, wherein said resource is a channel resource.

27. The base station of claim 22, wherein said base station transmits into two cells in said network.

28. The base station of claim 22, wherein said handover is under addition of a new cell.

29. The base station of claim 22, further comprising a controller for connecting and disconnecting outputs from said transmitter units to a base station output.

30. An arrangement in a communications network, the network having a base station comprising at least two hardware units, a first and a second hardware unit, and a controller unit, said base station being arranged to allow handover of recourses between said hardware units,
   characterised in
   that said arrangement, arranged to adjust power between said hardware units comprises a processor unit for configuring said resource, means for obtaining a sample of a power, means for transferring said power sample to said second hardware unit and means for controlling the power level on second unit by a power control value calculated with turned off output power on said second unit.

31. The arrangement of claim 30, wherein said hardware units are transmitter units.

32. The arrangement of claim 30, wherein said resource is a channel resource.

33. The arrangement of claim 30, further comprising means for connecting and disconnecting outputs from said transmitter units to a base station output.

* * * * *

UNITED STATES PATENT AND TRADEMARK OFFICE
CERTIFICATE OF CORRECTION

PATENT NO. : 7,539,515 B2 Page 1 of 1
APPLICATION NO. : 10/584756
DATED : May 26, 2009
INVENTOR(S) : Carlsson et al.

It is certified that error appears in the above-identified patent and that said Letters Patent is hereby corrected as shown below:

In Column 2, Line 39, delete "levels" and insert -- levels. --, therefor.

In Column 3, Line 52, delete "eliminated" and insert -- eliminated. --, therefor.

Signed and Sealed this

Seventeenth Day of November, 2009

David J. Kappos
*Director of the United States Patent and Trademark Office*